US006485701B2

(12) United States Patent
Miyoshi

(10) Patent No.: US 6,485,701 B2
(45) Date of Patent: Nov. 26, 2002

(54) OXIDE HAVING PEROVSKITE STRUCTURE, BARIUM TITANATE, AND MANUFACTURING METHOD THEREFOR, DIELECTRIC CERAMIC, AND CERAMIC ELECTRONIC COMPONENT

(75) Inventor: Toshiyuki Miyoshi, Omihachiman (JP)

(73) Assignee: Murata Manufacturing Co., Ltd. (JP)

( * ) Notice: Subject to any disclaimer, the term of this patent is extended or adjusted under 35 U.S.C. 154(b) by 5 days.

(21) Appl. No.: 09/797,350

(22) Filed: Mar. 1, 2001

(65) Prior Publication Data

US 2001/0026865 A1 Oct. 4, 2001

(30) Foreign Application Priority Data

Mar. 2, 2000 (JP) .......................................... 2000-057078
Jan. 24, 2001 (JP) .......................................... 2001-015461

(51) Int. Cl.$^7$ .......................... C01F 11/00; C01G 23/00; C01G 21/00
(52) U.S. Cl. ........................................ 423/593; 423/598
(58) Field of Search ................................ 423/593, 598, 423/263, 71; 501/104, 123, 134, 135, 136, 137, 138, 139

(56) References Cited

U.S. PATENT DOCUMENTS 5,556,818 A * 9/1996 Kohler et al. ................ 423/598
5,900,223 A * 5/1999 Matijevic et al. ........... 423/593

FOREIGN PATENT DOCUMENTS

JP 64-003063 * 1/1989

OTHER PUBLICATIONS

J. Wang et al., "Ultrafine Barium Titanate Powders via Microemulsion Processing Routes," Journal of the American Ceramic Society, (1999), pp. 873–881, vol. 82, No. 4, no month.

S. Urek et al., "The Hydrothermal Synthesis of BaTiO$_3$ Fine Particles from Hydroxide–Alkoxide Precursors," Journal of the European Ceramic Society, (1998), pp. 279–286, vol. 18, No. 4, no month.

X. Chang–Tai et al., "Preparation of BaTiO$_3$ by the Hydrothermal Method," Journal of the European Ceramic Socity, (1995), pp. 1171–1176, vol. 15, No. 12, no month.

* cited by examiner

Primary Examiner—Steven Bos
(74) Attorney, Agent, or Firm—Dickstein, Shapiro, Morin & Oshinsky, LLP.

(57) ABSTRACT

An oxide having a perovskite structure, for example, barium titanate, is provided in which the particle diameter is as small as about 0.03 to 0.2 $\mu$m, the amount of OH groups in the crystal lattice is less than about 0.2% by weight, the c/a axial ratio is as large as about 1.0033 or more and sufficient ferroelectricity is exhibited. Barium titanate is produced with steps of mixing a BaCO$_3$ powder and a TiO$_2$ powder having a specific surface area of about 10 m$^2$/g or more and heat-treating the mixed powder. In the heat treatment, in the case in which a partial pressure of oxygen is decreased to about $2\times10^3$ Pa or less and more than about $2\times10^2$ Pa, the heat treatment is performed at a temperature within the range of about 700 to 1100° C., and in the case in which a partial pressure of oxygen is decreased to about $2\times10^2$ Pa or less, the heat treatment is performed at a temperature within the range of about 600 to 1100° C.

5 Claims, 1 Drawing Sheet

OXIDE HAVING PEROVSKITE STRUCTURE, BARIUM TITANATE, AND MANUFACTURING METHOD THEREFOR, DIELECTRIC CERAMIC, AND CERAMIC ELECTRONIC COMPONENT

BACKGROUND OF THE INVENTION

1. Field of the Invention

The present invention relates to an oxide having a perovskite structure, barium titanate, and a manufacturing method therefor, dielectric ceramic, and ceramic electronic component.

2. Description of the Related Art

An oxide having a perovskite structure, for example, barium titanate, has been used as a dielectric material for electronic components such as capacitors. Recently, it is required that the oxide having the perovskite structure be a powder having a smaller particle diameter.

For example, miniaturization and an increase in capacitance in a monolithic ceramic capacitor have been attempted by decreasing the thickness of the dielectric ceramic layer, and for such a purpose, oxides having the perovskite structure, for example, barium titanate having not only higher dielectric constant, but also smaller particle diameter, have been required. Hitherto, barium titanate having a particle diameter of about 0.2 $\mu$m or less has been produced by wet methods such as hydrolysis and hydrothermal synthesis.

In barium titanate synthesized by a conventional wet method, however, there are problems in that about 0.2 to 3% by weight of OH groups remain in the particle, and in spite of small particle diameter, the crystal system is a cubic system or a tetragonal system in which the ratio of the a axis to c axis in the crystal lattice, that is, the c/a axial ratio (x), is so small as not to fulfill the relationship represented by the formula $x \geq 1+(k-1)\times 0.3$, where k indicates a theoretical value of the c/a axial ratio (in barium titanate, k=1.011 and $x \geq 1.0033$), and therefore sufficient ferroelectricity for a capacitor material is not exhibited.

In order to solve the aforementioned problems, it has been attempted to produce barium titanate having a large c/a axial ratio and exhibiting sufficient ferroelectricity by reheating the synthesized barium titanate for removal of the OH groups. Since cavities are, however, generated at places where OH groups were present and the growth of particles of barium titanate occurs during the reheating, it becomes difficult to produce barium titanate having a particle diameter of as small as about 0.2 $\mu$m or less. At the same time, when the thickness of dielectric ceramic layer in laminated ceramic electronic components using such a barium titanate, for example, monolithic ceramic capacitors, is decreased to several $\mu$m or less, it also encounters problems of short circuit occurrence and degradation in other characteristics.

SUMMARY OF THE INVENTION

Accordingly, the object of the present invention are to provide a manufacturing method for an oxide having the perovskite structure, for example, barium titanate, having a small particle diameter, having small amounts of OH groups, having a large c/a axial ratio and exhibiting sufficient ferroelectricity and to provide the oxide having the perovskite structure produced by the aforementioned manufacturing method, a dielectric ceramic produced using a powder made of such an oxide and a laminated ceramic electronic component produced using such a dielectric ceramic.

A manufacturing method for an oxide having a perovskite structure according to the present invention comprises steps of preparing a metallic oxide powder having a specific surface area of about 10 m$^2$/g or more and preparing a metallic carbonate powder, mixing the metallic oxide powder and the metallic carbonate powder, and heat-treating the resulting mixed powder at a partial pressure of oxygen of about $2\times 10^3$ Pa or less.

At least two kinds of metallic oxide powders and metallic carbonate powders may be used, respectively.

The present invention also relates to an oxide having the perovskite structure. This oxide is preferably a powder having a particle diameter of about 0.03 to 0.2 $\mu$m and the amount of OH groups in the crystal lattice may be less than about 0.2% by weight.

The measured value of the c/a axial ratio in the crystal lattice of this oxide indicated by x and the theoretical value of the c/a axial ratio indicated by k of this oxide are preferably in a relationship fulfilling the condition represented by the formula $x \geq 1+(k-1)\times 0.3$.

The aforementioned oxide having the perovskite structure can be synthesized with advantage by, for example, the aforementioned manufacturing method.

The manufacturing method for the oxide having the perovskite structure according to the present invention can be specifically applied to a manufacturing method for barium titanate.

The specific manufacturing method for barium titanate is composed of steps of preparing a TiO$_2$ powder having a specific surface area of about 10 m$^2$/g or more and preparing a BaCO$_3$ powder, mixing the TiO$_2$ powder and the BaCO$_3$ powder, and heat-treating the resulting mixed powder.

In the case in which the aforementioned step of heat-treating is performed at a partial pressure of oxygen of about $2\times 10^3$ Pa or less and exceeding about $2\times 10^2$ Pa, a heat-treating temperature within the range of about 700 to 1,100° C. may be applied. In the case in which the aforementioned heat-treating is performed at a partial pressure of oxygen of about $2\times 10^2$ Pa or less, a heat-treating temperature within the range of about 600 to 1,100° C. may be applied.

The present invention also relates to barium titanate. This barium titanate is preferably a powder having a particle diameter of about 0.03 to 0.2 $\mu$m and the amount of OH groups in a crystal lattice is less than about 0.2% by weight.

The c/a axial ratio of this barium titanate is preferably 1.0033 or more.

The aforementioned barium titanate can be synthesized with advantage by, for example, the aforementioned manufacturing method.

The present invention also relates to a dielectric ceramic produced by firing the aforementioned powder made of the oxide having the perovskite structure such as barium titanate.

The present invention also relates to a ceramic electronic component including the aforementioned dielectric ceramic and electrodes facing to each other with the dielectric ceramic therebetween.

The present invention also relates to a laminated ceramic electronic component including a laminate composed of a plurality of laminated dielectric ceramic layers and an internal conductor formed along a specified interface between the dielectric ceramic layers. Herein, the aforementioned dielectric ceramic layers are made of a dielectric ceramic according to the present invention.

In the laminated ceramic electronic component according to the present invention, the dielectric ceramic layer may be made of a dielectric ceramic produced by firing a powder, having a particle diameter of about 0.03 to 0.1 μm, made of an oxide having the perovskite structure, e.g., barium titanate, and the thickness of the dielectric ceramic layer is preferably about 1 μm or less.

In the aforementioned laminated ceramic electronic component according to a specific embodiment, a plurality of external electrodes arranged at positions different from each other on the end face of the aforementioned laminate are further provided and a plurality of internal conductors are formed with an end edge thereof being exposed on the end face of the laminate so as to be electrically connected to one of the external electrodes. The configuration of this laminated ceramic electronic component may be applied to, for example, monolithic ceramic capacitors.

DESCRIPTION OF THE PREFERRED EMBODIMENTS

Figure 1:
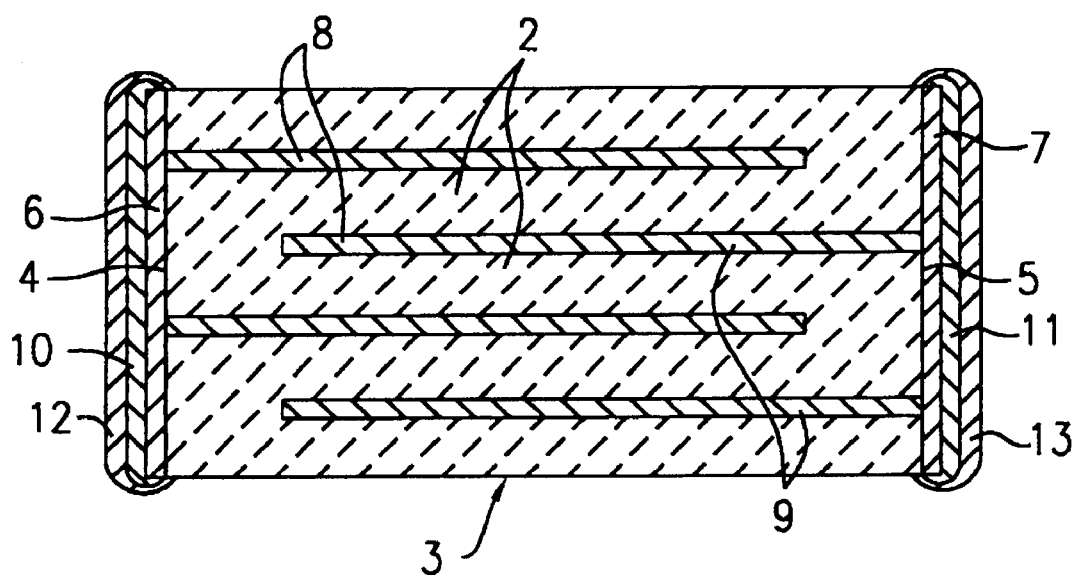
FIG. 1 is a sectional view of a monolithic ceramic capacitor 1 according to an embodiment of the present invention.

FIG. 1 is a sectional view of a monolithic ceramic capacitor 1 as an example of a laminated ceramic electronic component according to the present invention.

The monolithic ceramic capacitor 1 is provided with a laminate 3 including a plurality of laminated dielectric ceramic layers 2 and a first external electrode 6 and a second external electrode 7 formed on a first end face 4 and a second end face 5, respectively, of the laminate 3.

First internal electrodes 8 and second internal electrodes 9 are alternately arranged as internal conductors in the laminate 3. The first internal electrodes 8 are formed along a plurality of specified interfaces between the dielectric ceramic layers 2, each edge thereof being exposed on the first end face 4 so as to be electrically connected to the first external electrode 6. The second internal electrodes 9 are formed along a plurality of specified interfaces between the dielectric ceramic layers 2, each edge thereof being exposed on the second end face 5 so as to be electrically connected to the second external electrode 7.

If necessary, the external electrodes 6 and 7 may be coated with first plating layers 10 and 11, respectively, made of Ni, Cu, Ni—Cu alloy, etc., and second plating layers 12 and 13 made of solder, tin, etc., may be formed on the first plating layers 10 and 11, respectively.

In the aforementioned monolithic ceramic capacitor 1, the laminate 3 thereof is provided with the dielectric ceramic layers 2 composed of the dielectric ceramic produced by firing the powder made of the oxide having the perovskite structure according to the present invention. This oxide having the perovskite structure will be explained below in detail.

So as to form the internal electrodes 8 and 9, for example, a conductive paste primarily containing Ni may be used.

The external electrodes 6 and 7 may be formed, for example, by steps of coating a silver paste containing $B_2O_3$—$Li_2O$—$SiO_2$—$BaO$ glass frit and baking the silver paste in reducing atmosphere.

Materials for the internal electrodes 8 and 9 and for the external electrodes 6 and 7 are not specifically limited to the aforementioned materials. For example, the external electrodes 6 and 7 may be formed of the same materials as those used for forming the internal electrodes 8 and 9.

According to the present invention, the oxide having the perovskite structure can be produced by steps of mixing at least one kind of metallic oxide powder having a specific surface area of about 10 $m^2$/g or more and at least one kind of metallic carbonate powder and thereafter heat-treating the resulting mixed powder at a partial pressure of oxygen of about $2 \times 10^3$ Pa or less.

As described above, by decreasing the partial pressure of oxygen during the heat treatment, decomposition of the metallic carbonate as an elemental material is realized at a lower temperature so that a highly reactive oxide is synthesized. The resulting highly reactive oxide reacts with a metallic oxide having been added beforehand so as to produce an oxide having the perovskite structure. In this reaction, the OH group is not involved in the reaction processes in contrast to hydrolysis and hydrothermal synthesis. Therefore, the OH groups present in the crystal lattice after the synthesis are limited to OH groups contained in the metallic carbonate and the metallic oxide so that the amount of the OH groups can be controlled to be about 0.2% by weight or less.

The aforementioned amount of the OH groups was determined by the thermogravimetric analysis of a sample after the synthesis based on the loss on heating at a temperature of 150° or more.

In order to produce a small particle diameter oxide having the perovskite structure by heat treatment at a lower temperature, it is preferable to perform the heat treatment at a partial pressure of oxygen of about $2 \times 10^3$ Pa or less, and more preferably at about $2 \times 10^2$ Pa or less. When the partial pressure of oxygen exceeds about $2 \times 10^3$ Pa, the particle diameter of the produced oxide having the perovskite structure is increased, which is not preferable.

In order to produce a smaller particle diameter oxide having the perovskite structure, it is preferable to use a metallic oxide having a specific surface area of about 10 $m^2$/g or more, and more preferably of about 15 $m^2$/g or more. When the specific surface area of the metallic oxide is less than about 10 $m^2$/g, the reactivity of the metallic oxide is not sufficient. Therefore, in synthesis of the targeted oxide having the perovskite structure, a higher temperature may be necessary for the heat treatment and a particle diameter of the synthesized oxide having the perovskite structure may be increased, which it is not preferable.

Since the decomposition temperature of the metallic carbonate varies due to the kind of the metallic carbonate, the way of combining the metallic carbonate and the metallic oxide, or the partial pressure of oxygen, the temperature and the time of the heat treatment are not specifically limited. The optimal conditions of the temperature and the time of the heat treatment are preferably predetermined based on a thermal analysis at a low partial pressure of oxygen, etc.

For example, in the case in which barium titanate is synthesized using $TiO_2$ and $BaCO_3$, when the partial pressure of oxygen is about $2 \times 10^3$ Pa or less and exceeds about $2 \times 10^2$ Pa and the temperature of the heat treatment is less than about 700° C., and when the partial pressure of oxygen is about $2 \times 10^2$ Pa or less and the temperature of the heat treatment is less than about 600° C., the synthesis reaction of barium titanate does not sufficiently proceeded and the c/a axial ratio is not increased. On the other hand, when the temperature of the heat treatment exceeds about 1,100° C. at either of the aforementioned partial pressures of oxygen, the growth of the particles and the sintering of the particles with each other in the synthesized barium titanate occur so as to increase particle diameters.

Therefore, when the partial pressure of oxygen is about $2 \times 10^3$ Pa or less and exceeds about $2 \times 10^2$ Pa, the temperature of the heat treatment is preferably within the range of about 700° C. to 1,100° C., and when particle pressure of oxygen is about $2 \times 10^2$ Pa or less, the temperature of the heat treatment is preferably within the range of about 600° C. to 1,100° C.

When heat treatments are performed under the same conditions of the particle diameter of the metallic oxide powder and the partial pressure of oxygen, and there is an increase in the temperature of the heat treatment, the particle diameter of the produced oxide having the perovskite structure is increased, although the c/a axial ratio is further increased.

According to the manufacturing method of the present invention as explained above, an oxide powder having the perovskite structure and having the particle diameter of about 0.03 to 0.2 μm can be produced.

According to the manufacturing method of the present invention, the oxide having a perovskite structure, in which the amount of the OH groups in the crystal lattice is less than about 0.2% by weight, can be produced. When the amount of the OH groups in the crystal lattice is about 0.2% by weight or more in the oxide having the perovskite structure, a further heat treatment may be required before use as a dielectric ceramic, or else in an electronic component produced using this oxide, a short circuit or other degradation may occur.

In the oxide having the perovskite structure produced by the manufacturing method of the present invention, the measured value of the c/a axial ratio in the crystal lattice of this oxide indicated by x and the theoretical value of the c/a axial ratio indicated by k of this oxide are in a relationship fulfilling the condition represented by the formula $x \geq 1+(k-1) \times 0.3$. In particular, the c/a axial ratio in barium titanate can be about 1.0033 or more. When the condition represented by the aforementioned formula is not fulfilled in the oxide, e.g., the c/a axial ratio is less than 1.0033 in barium titanate, due to the shortage of ferroelectricity for the use as an electronic component, further heat treatment is required so as to increase the c/a axial ratio, and therefore, growth of the particle occurs.

The oxide having the perovskite structure according to the present invention is not limited to the oxide in which the ratio of metallic atoms contained in the metallic carbonate (A) to atoms contained in the metallic oxide (B), that is, an atomic ratio A/B, is 1. In accordance with the purpose of the use, the oxide having the perovskite structure may has varied atomic ratios A/B of, for example, about 0.95 to 1.05. In particular, this atomic ratio A/B is preferably within the range about 1.000 to 1.035 so as to produce an oxide having a non-reducing property and the perovskite structure.

The dielectric ceramic produced by firing the aforementioned oxide powder having the perovskite structure may be a dielectric ceramic produced with Ca, rare-earth elements, additives, for example, Zr, Mn, Mg, Si, Gd, Dy, Ho and Er, or sintering promoters composed of, for example, Mg, Mn and Si, being added to the aforementioned oxide having the perovskite structure in accordance with required properties.

In the above description, as the oxide having the perovskite structure according to the present invention, barium titanate synthesized using $TiO_2$ and $BaCO_3$ was taken as an example, although the present invention can be applied to synthesis of oxides having the perovskite structure, for example, calcium titanate, strontium titanate, lead titanate and lead zirconate, using combinations of other metallic oxides and metallic carbonates, and to synthesis of mixtures and solid solutions thereof.

The present invention will be explained below using specific examples according to an embodiment in which barium titanate is synthesized using $TiO_2$ and $BaCO_3$.

EXAMPLE 1

As starting materials, a $BaCO_3$ powder and a $TiO_2$ powder having a specific surface area of 30 $m^2$/g were prepared.

These starting materials were weighed so that the ratio Ba/Ti on a mole basis becomes 1.00, and were wet mixed.

The resulting mixture was subjected to a step of vaporizing and drying, and thereafter, was heat-treated at 800° C. for 5 hours in a batch furnace controlled at a pressure of $1 \times 10^2$ Pa, $1 \times 10^3$ Pa or $1 \times 10^4$ Pa, and at an atmospheric pressure, that is, $2 \times 10^1$ Pa, $2 \times 10^2$ Pa, $2 \times 10^3$ Pa or $2 \times 10^4$ Pa in terms of a partial pressure of oxygen, respectively, so as to produce barium titanate powders.

Regarding the resulting barium titanate powders, the particle diameters were measured by the observation using an electron microscope, the amounts of OH groups were determined by the thermogravimetric analysis, and furthermore, the c/a axial ratios were determined by X-ray diffraction analysis and Rietveld analysis. The results thereof and the results of total evaluations are shown in Table 1.

TABLE 1

| Sample No. | Specific Surface Area of $TiO_2$ ($m^2$/g) | Partial Pressure of Oxygen (Pa) | Temperature of Heat Treatment (° C.) | Particle Diameter (nm) | Amount of OH Group (wt %) | c/a Axial Ratio |
|---|---|---|---|---|---|---|
| 1 | 30 | $2 \times 10^1$ | 800 | 53 | 0.05 | 1.005 |
| 2 |    | $2 \times 10^2$ |     | 54 | 0.06 | 1.005 |
| 3 |    | $2 \times 10^3$ |     | 65 | 0.08 | 1.006 |
| 4 |    | $2 \times 10^4$ |     | 210 | 0.08 | 1.009 |

As shown in Table 1, Sample Nos. 1 to 3 heat-treated at partial pressures of oxygen of $2 \times 10^1$ Pa, $2 \times 10^2$ Pa, and $2 \times 10^3$ Pa, respectively, indicate that barium titanate powders having particle diameters of about 0.03 to 0.2 μm, amounts of OH groups of less than about 0.2% by weight, and c/a axial ratios of about 1.0033 or more could be produced.

On the other hand, Sample No. 4 heat-treated at a partial pressure of oxygen of $2 \times 10^4$ Pa (i.e., exceeding $2 \times 10^3$ Pa) indicates that the particle was grown to have a particle diameter exceeding 0.2 μm.

EXAMPLE 2

As starting materials, a $BaCO_3$ powder and $TiO_2$ powders having specific surface areas of 5 $m^2$/g, 10 $m^2$/g, 15 $m^2$/g, 20 $m^2$/g or 30 $m^2$/g, respectively, were prepared.

These starting materials were weighed so that the ratio Ba/Ti on a mole basis became 1.00, and were wet mixed.

The resulting mixture was subjected to a step of vaporizing and drying, and thereafter, was heat-treated at 800° C. for 5 hours in a batch furnace controlled at a pressure of $1 \times 10^3$ Pa, that is, $2 \times 10^2$ Pa in terms of partial pressure of oxygen, so as to produce barium titanate powders.

Regarding the resulting barium titanate powders, the particle diameters, amounts of OH groups and c/a axial ratios were determined in a manner similar to that in the Example 1. The results thereof and the results of total evaluations are shown in Table 2.

TABLE 2

| Sample No. | Specific Surface Area of TiO$_2$ (m$^2$/g) | Partial Pressure of Oxygen (Pa) | Temperature of Heat Treatment (° C.) | Particle Diameter (nm) | Amount of OH Group (wt %) | c/a Axial Ratio |
|---|---|---|---|---|---|---|
| 5 | 5 | 2 × 10$^2$ | 800 | 361 | 0.06 | 1.009 |
| 6 | 10 | | | 181 | 0.06 | 1.008 |
| 7 | 15 | | | 121 | 0.05 | 1.007 |
| 8 | 20 | | | 90 | 0.05 | 1.006 |
| 9 | 30 | | | 54 | 0.06 | 1.005 |

As shown in Table 2, Sample Nos. 6 to 9 using TiO$_2$ powders having specific surface areas of 10 m$^2$/g, 15 m$^2$/g, 20 m$^2$/g and 30 m$^2$/g, respectively, indicate that barium titanate powders having particle diameters of about 0.03 to 0.2 μm, amounts of OH groups of less than about 0.2% by weight and c/a axial ratios of about 1.0033 or more could be produced.

On the other hand, Sample No. 5 using TiO$_2$ powder having a specific surface area of 5 m$^2$/g (i.e., less than 10 m$^2$/g) indicates that the particle was grown to have a particle diameter exceeding about 0.2 μm.

EXAMPLE 3

As starting materials, a BaCO$_3$ powder and a TiO$_2$ powder having a specific surface area of 30 m$^2$/g were prepared.

These starting materials were weighed so that the ratio Ba/Ti on a mole basis was 1.00, and were wet mixed.

The resulting mixture was subjected to a step of vaporizing and drying, and thereafter, was heat-treated in a batch furnace controlled at a pressure of 1×10$^3$ Pa, that is, 2×10$^2$ Pa in terms of partial pressure of oxygen, at a temperature of 500° C., 600° C., 700° C., 800° C., 900° C., 1,000° C., 1,100° C. or 1,200° C., for 5 hours, so as to produce barium titanate powders.

Regarding the resulting barium titanate powders, the particle diameters, amounts of OH groups, and c/a axial ratios were determined in a manner similar to that in the Example 1. The results thereof and the results of total evaluations are shown in Table 3.

TABLE 3

| Sample No. | Specific Surface Area of TiO$_2$ (m$^2$/g) | Partial Pressure of Oxygen (Pa) | Temperature of Heat Treatment (° C.) | Particle Diameter (nm) | Amount of OH Group (wt %) | c/a Axial Ratio |
|---|---|---|---|---|---|---|
| 10 | 30 | 2 × 10$^2$ | 500 | — | — | — |
| 11 | | | 600 | 43 | 0.18 | 1.004 |
| 12 | | | 700 | 45 | 0.10 | 1.004 |
| 13 | | | 800 | 54 | 0.06 | 1.005 |
| 14 | | | 900 | 74 | 0.05 | 1.006 |
| 15 | | | 1000 | 110 | 0.04 | 1.007 |
| 16 | | | 1100 | 164 | 0.04 | 1.008 |
| 17 | | | 1200 | 246 | 0.04 | 1.009 |

As shown in Table 3, Sample Nos. 11 to 16 heat-treated at temperatures of 600° C., 700° C., 800° C., 900° C., 1,000° C. or 1,100° C., respectively, indicate that barium titanate powders having particle diameters of about 0.03 to 0.2 μm, amounts of OH groups of less than about 0.2% by weight and c/a axial ratios of about 1.0033 or more could be produced.

On the contrary, Sample No. 10 heat-treated at a temperature of 500° C. (i.e., less than 600° C.) indicates that the synthesis reaction was not completed as shown in Table 3 with blank columns "Particle Diameter", "Amount of OH Group", and "c/a Axial Ratio".

On the other hand, Sample No. 17 heat-treated at a temperature of 1,200° C. (i.e., exceeding 1,100° C.) indicates that the particle was grown to have a particle diameter exceeding 0.2 μm.

EXAMPLE 4

As starting materials, a BaCO$_3$ powder and a TiO$_2$ powder having a specific surface area of 30 m$^2$/g were prepared.

These starting materials were weighed so that the ratio Ba/Ti on a mole basis was 1.00, and were wet mixed.

The resulting mixture was subjected to a step of vaporizing and drying, and thereafter, was heat-treated in a batch furnace controlled at a pressure of 1×10$^4$ Pa, that is, 2×10$^3$ Pa in terms of a partial pressure of oxygen, at temperatures of 600° C., 700° C., 800° C., 900° C., 1,000° C., 1,100° C. or 1,200° C. for 5 hours so as to produce barium titanate powders.

Regarding the resulting barium titanate powders, the particle diameters, amounts of OH groups, and c/a axial ratios were determined in a manner similar to that in the Example 1. The results thereof and the results of total evaluations are shown in Table 4.

TABLE 4

| Sample No. | Specific Surface Area of TiO$_2$ (m$^2$/g) | Partial Pressure of Oxygen (Pa) | Temperature of Heat Treatment (° C.) | Particle Diameter (nm) | Amount of OH Group (wt %) | c/a Axial Ratio |
|---|---|---|---|---|---|---|
| 18 | 30 | 2 × 10$^3$ | 600 | — | — | — |
| 19 | | | 700 | 54 | 0.12 | 1.005 |
| 20 | | | 800 | 65 | 0.08 | 1.006 |
| 21 | | | 900 | 88 | 0.06 | 1.006 |
| 22 | | | 1000 | 132 | 0.06 | 1.007 |
| 23 | | | 1100 | 198 | 0.05 | 1.008 |
| 24 | | | 1200 | 298 | 0.05 | 1.009 |

In the aforementioned Example 3, the heat treatment was performed at a partial pressure of oxygen of 2×10$^2$ Pa, although in this Example 4, the heat treatment was performed at a partial pressure of oxygen of 2×10$^3$ Pa (i.e., exceeding 2×10$^2$ Pa).

As shown in Table 4, Sample Nos. 19 to 23 heat-treated at temperatures of 700° C., 800° C., 900° C., 1,000° C. or 1,100° C., respectively, indicate that barium titanate powders having particle diameters of about 0.03 to 0.2 μm, amounts of OH groups of less than about 0.2% by weight and c/a axial ratios of about 1.0033 or more could be produced.

On the contrary, Sample No. 18 heat-treated at a temperature of 600° C. (i.e., less than 700° C.) indicates that the synthesis reaction was not completed similarly to that in Sample No. 10 as shown in Table 3.

On the other hand, Sample No. 24 heat-treated at a temperature of 1,200° C. (i.e., exceeding 1,100° C.) indicates that the particle was grown to have a particle diameter exceeding 0.2 μm.

EXAMPLE 5

As starting materials, a $BaCO_3$ powder and a $TiO_2$ powder having a specific surface area of 30 $m^2/g$ were prepared.

These starting materials were weighed so that the ratio Ba/Ti on a mole basis became 1.00, and were wet mixed.

The resulting mixture was subjected to a step of vaporizing and drying, and thereafter, was heat-treated at 800° C. for 5 hours in a batch furnace, in which atmospheric gas had been replaced by nitrogen gas and the partial pressure of oxygen was controlled to be 1 Pa, so as to produce a barium titanate powder of Sample No. 25.

Furthermore, the aforementioned mixture subjected to a step of vaporizing and drying was heat-treated at 800° C. for 5 hours in a batch furnace, in which atmospheric gas had been replaced by a mixed gas containing 95% of nitrogen and 5% of hydrogen and the partial pressure of oxygen was controlled to be $1 \times 10^{-7}$ Pa, so as to produce a barium titanate powder of Sample No. 26.

Regarding the resulting barium titanate powders, the particle diameters, amounts of OH groups, and c/a axial ratios were determined in a manner similar to that in the Example 1. The results thereof and the results of total evaluations are shown in Table 5.

TABLE 5

| Sample No. | Specific Surface Area of $TiO_2$ ($m^2/g$) | Partial Pressure of Oxygen (Pa) | Temperature of Heat Treatment (° C.) | Particle Diameter (nm) | Amount of OH Group (wt %) | c/a Axial Ratio |
|---|---|---|---|---|---|---|
| 25 | 30 | nitrogen/1 | 800 | 58 | 0.05 | 1.005 |
| 26 | | mixed gas of nitrogen and hydrogen/ $1 \times 10^{-7}$ | | 55 | 0.04 | 1.005 |

As shown in Table 5, in the case in which the heat treatment was performed after nitrogen gas had been introduced and in the case in which the heat treatment was performed after a mixed gas containing nitrogen and hydrogen had been introduced, barium titanate powders having particle diameters of about 0.03 to 0.2 μm, amounts of OH groups of less than about 0.2% by weight and c/a axial ratios of about 1.0033 or more could be produced.

In the Examples 1 to 5 explained in the above description, a $TiO_2$ powder made of anatase $TiO_2$ was used, although a $TiO_2$ powder made of rutile $TiO_2$ or $TiO_2$ of a mixture of anatase and rutile may be used so as to produce a similar effect.

In the Examples 1 to 5, a $BaCO_3$ powder having a specific surface area of 7 $m^2/g$ was used, although since $BaCO_3$ is decomposed during the reaction and Ba atoms generated by the decomposition diffuse into the particle of $TiO_2$ so as to synthesize $BaTiO_3$. When a $BaCO_3$ powder having a greater specific surface area is used and in the case in which a $BaCO_3$ powder having a smaller specific surface area is used, similar effects may be produced.

EXAMPLE 6

As starting materials, a $BaCO_3$ powder and a $TiO_2$ powder having a specific surface area of 30 $m^2/g$ were prepared.

These starting materials were weighed so that the ratio Ba/Ti on a mole basis was 1.01, and were wet mixed.

The resulting mixture was subjected to a step of vaporizing and drying, and thereafter, was heat-treated in a batch furnace controlled at a pressure of $1 \times 10^{-1}$ Pa, that is, $2 \times 10^{-2}$ Pa in terms of partial pressure of oxygen, at a temperature of 900° C. for 5 hours so as to produce a barium titanate powder.

Regarding the resulting barium titanate powder of Sample No. 27, the particle diameter, amount of OH groups and c/a axial ratio were determined in a manner similar to that in the Example 1. The results thereof are shown in Table 6.

TABLE 6

| Sample No. | Specific Surface Area of $TiO_2$ ($m^2/g$) | Partial Pressure of Oxygen (Pa) | Temperature of Heat Treatment (° C.) | Particle Diameter (nm) | Amount of OH Group (wt %) | c/a Axial Ratio |
|---|---|---|---|---|---|---|
| 27 | 30 | $2 \times 10^{-2}$ | 900 | 70 | 0.05 | 1.007 |

Furthermore, barium titanate powders of Sample Nos. 12 to 14 as shown in Table 3 were also prepared.

Sample Nos. 12 to 14 and 27 had particle diameters within the range 0.03 to 0.1 μm.

Each barium titanate powder of Sample Nos. 12 to 14 and 27 was dispersed into an organic solvent, and 0.02 mol of Dy, 0.015 mol of Mg, 0.005 mol of Mn, or 0.03 mol of a Si sintering promoter relative to 1 mol of barium titanate were added thereto, respectively, as alkoxide compounds soluble into the organic solvent.

It was confirmed that the aforementioned additives might be added as compounds other than an alkoxide, such as an acetylacetonato or a metallic soap, so as to become soluble into the organic solvent.

The organic solvent was removed from the slurry produced as described above by vaporization and drying, and other organic compounds were removed by further heat treatment.

A polyvinyl butyral binder solution and an organic solvent, for example, ethanol, were added to the barium titanate powder samples to which each additive had been added as described above, and ceramic slurries were produced by wet mixing using a ball mill.

The resulting ceramic slurries were sheet molded by the doctor blade method being applied so as to produce rectangular ceramic green sheets of 1.5 μm in thickness.

The green sheets were screen printed with a conductive paste primarily containing Ni so as to form conductive paste films corresponding to internal electrodes 8 and 9 as shown in FIG. 1.

A plurality of green sheets were laminated with the sides thereof to which the aforementioned conductive paste films had been drawn being in two rows in a staggered configuration so as to produce a green laminate.

The laminate was heated to a temperature of 350° C. in nitrogen atmosphere so as to burn the binder, and thereafter, was fired in a reducing atmosphere composed of $H_2$—$N_2$—$H_2O$ gas having a partial pressure of oxygen of $10^{-3}$ to $10^{-6}$ Pa at a temperature of 1050° C. for 2 hours so as to produce a sintered laminate shown as laminate 3 in FIG. 1.

Both end faces of this laminate were coated with a silver paste containing $B_2O_3$—$Li_2O$—$SiO_2$—$BaO$ glass frit and the silver paste was baked in nitrogen atmosphere at a temperature of 600° C. so as to form external electrodes corresponding to external electrodes 6 and 7 as shown in FIG. 1.

In monolithic ceramic capacitors according to Sample Nos. 12 to 14 and 27 produced as described above, the outer dimensions thereof were 5.0 mm in width, 5.7 mm in length and 2.4 mm in thickness and the thickness of a dielectric ceramic layer intervening between the first internal electrode and the second internal electrode was 1.0 μm. The total number of effective dielectric ceramic layers were 100 and an area of a counter electrode per layer was $16.3 \times 10^{-6}$ m$^2$.

Regarding each resulting monolithic ceramic capacitor, the capacitance, dielectric loss and resistivity were determined. The capacitance (C) and the dielectric loss (tan δ) were measured using an automatic bridge type measuring apparatus based on JIS 5102. Insulation resistances at 25° C. were determined using an insulation resistance tester with application of 10 V of direct-current voltage for 2 minutes and the resistivity ρ was calculated from the insulation resistance.

Regarding the resulting monolithic ceramic capacitors, average lives were evaluated. That is, high temperature load tests applying 6 V of direct-current voltage at a temperature of 150° C. were performed. During this high temperature load tests, variations with time of the insulation resistances of monolithic ceramic capacitors according to the samples were measured, and when the value of the insulation resistance (R) had become $10^5$ Ω or less, that point was regarded as the time of occurrence of failure. The time lapsed until the failure had occurred was regarded as the life and the average value thereof was regarded as average life.

Failure rates were determined from the number of samples, electrical properties of which could not be evaluated as described above.

Results of the aforementioned electrical properties and failure rates are shown in Table 7.

TABLE 7

| Sample NO. | Temperature of Heat Treatment (° C.) | Capacitance (μF) | Dielectric Loss tan δ (%) | Resistivity ρ log ρ (Ωcm) | Average life (hr) | Failure Rate (%) |
|---|---|---|---|---|---|---|
| 12 | 1050 | 25.4 | 3.8 | 12.4 | 61.7 | 0.8 |
| 13 | 1050 | 27.4 | 3.5 | 12.8 | 63.9 | 0.6 |
| 14 | 1050 | 29.2 | 3.3 | 12.9 | 70.1 | 0.2 |
| 27 | 1050 | 31.8 | 2.5 | 13.0 | 72.5 | 0.2 |

As shown in Table 7, each monolithic ceramic capacitor according to Sample Nos. 12 to 14 and 27 exhibits preferable electric properties. In the monolithic ceramic capacitors, even though the thickness of the dielectric ceramic layers were as small as 1.0 μm, the failure rates of the samples produced in Example 6 were as small as 0.8% or less.

As described above, according to the manufacturing method for the oxide having the perovskite structure or barium titanate of the present invention, an oxide having the perovskite structure or barium titanate can be produced in which the particle diameter is as small as about 0.03 to 0.2 μm, the amount of OH groups in a crystal lattice is less than about 0.2% by weight and the measured value of the c/a axial ratio of the oxide indicated by x and a theoretical value of the c/a axial ratio indicated by k of the oxide are in a relationship fulfilling the condition represented by the formula $x \geq 1+(k-1) \times 0.3$, e.g., barium titanate has a c/a axial ratio of as large as about 1.0033 or more, and exhibits sufficient ferroelectricity.

By using this oxide having the perovskite structure, for example, barium titanate, ceramic electronic components having high dielectric constants and exhibiting high performances, for example, laminated ceramic electronic components such as monolithic ceramic capacitors, can be produced at a relatively low firing temperature.

Furthermore, in the case in which the present invention is more specifically applied to a laminated ceramic electronic component including a laminate having a configuration in which a plurality of dielectric ceramic layers and a plurality of internal conductors are laminated, for example, a monolithic ceramic capacitor, the thickness of dielectric ceramic layers can be further decreased. In particular, by using a finer powder, for example, of about 0.03 to 0.1 μm in particle diameter, made of the oxide having the perovskite structure, even when the thickness of the ceramic layer is decreased to, for example, about 1 μm or less, the laminated ceramic electronic component can be produced with high reliability and with no problem. Therefore, when the present invention is applied to the monolithic ceramic capacitor, a miniaturized and large capacitance monolithic ceramic capacitor can be easily produced.

What is claimed is:

1. A manufacturing method for an oxide having a perovskite structure, comprising:

providing a metal oxide powder having a specific surface area of about 10 m$^2$/g or more and a metal carbonate powder;

mixing said metal oxide powder and said metal carbonate powder; and causing the metal oxide and metal carbonate to form the oxide having a perovskite structure by heat-treating the resulting mixed powder at a partial pressure of oxygen of about $2 \times 10^3$ Pa or less.

2. A manufacturing method according to claim 1, wherein the metal oxide is TiO$_2$ and the carbonate is BaCO$_3$, and wherein the heat-treating the mixed powder is at a partial pressure of oxygen exceeding about $2 \times 10^2$ Pa and at a temperature in the range of about 700 to 1,000° C.

3. A manufacturing method according to claim 1, wherein the metal oxide is TiO$_2$ and the carbonate is BaCO$_3$, and wherein the heat-treating the mixed powder is at a partial pressure of oxygen of less than about $2 \times 10^2$ Pa and at a temperature in the range of about 600 to 1,100° C.

4. A manufacturing method according to claim 1, wherein the metal oxide is TiO$_2$ and the carbonate is a carbonate of at least one of Ba, Sr, Ca and Pb, and wherein the heat-treating the mixed powder is at a temperature in the range of about 600 to 1,100° C.

5. A manufacturing method according to claim 1, wherein the metal oxide has a specific surface area of about 15 m$^2$/g or more.

* * * * *